US006781562B1

(12) United States Patent
Lungwitz

(10) Patent No.: US 6,781,562 B1
(45) Date of Patent: Aug. 24, 2004

(54) RADIO TRANSMITTER/RADIO RECEIVER UNIT COMPRISING A TUNEABLE ANTENNA

(75) Inventor: Matthias Lungwitz, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 10/149,231

(22) PCT Filed: Nov. 28, 2000

(86) PCT No.: PCT/DE00/04225

§ 371 (c)(1),
(2), (4) Date: Jun. 6, 2002

(87) PCT Pub. No.: WO01/45203

PCT Pub. Date: Jun. 21, 2001

(30) Foreign Application Priority Data

Dec. 13, 1999 (DE) ........................................ 199 59 983

(51) Int. Cl.[7] ................................................ A01Q 1/38
(52) U.S. Cl. ................................ 343/900; 343/700 MS
(58) Field of Search .......................... 343/900, 700 MS; 342/13, 1, 2, 3, 4, 5, 6, 7

(56) References Cited

U.S. PATENT DOCUMENTS 3,500,418 A 3/1970 Kuhne et al. ............... 343/705
6,300,894 B1 * 10/2001 Lynch et al. .................. 342/13
6,496,147 B1 * 12/2002 Kirino ................. 343/700 MS

FOREIGN PATENT DOCUMENTS

JP 61169003 7/1986
WO WO 99/35705 7/1999

OTHER PUBLICATIONS

Patent Abstracts of Japan, vol. 10, No. 376 Dec. 13, 1986.
Rostbakken et al., "An Adaptive Microstrip Patch Antenna for Use in Portable Transceivers", IEEE Vehicular Technology, Apr. 28, 1996, p. 340.

* cited by examiner

*Primary Examiner*—James Clinger
(74) *Attorney, Agent, or Firm*—Bell Boyd & Lloyd LLC

(57) ABSTRACT

A radio transmitter and receiver is provided having an electrically acting antenna body in whose near region a dielectric body is arranged, with the dielectric constant of the dielectric body being varied by at least one control signal to ensure an optimum value for at least one physical variable representing a function of the transmission/reception quality of the radio transmitter and receiver.

10 Claims, 2 Drawing Sheets

RADIO TRANSMITTER/RADIO RECEIVER UNIT COMPRISING A TUNEABLE ANTENNA

BACKGROUND OF THE INVENTION

In radio communication systems, messages (for example, speech, picture information or other data) are transmitted via electromagnetic waves. The electromagnetic waves are transmitted via of antennas, and carrier frequencies which are in the frequency band provided for the respective system.

In addition to the requirement that the dimensions of the antenna must be limited for mobile radio transmitters and receivers, there is also increasingly a requirement for the capability to transmit and receive in different frequency bands. For this reason, there is a requirement for antennas which can be used in a number of frequency bands.

With conventional antennas, such rod antennas (which are used, in particular, in mobile parts), it is impossible to ensure the required coverage of a frequency range which is as wide as possible or of a number of frequency bands, since the impedance and antenna gain of the antenna vary severely as a function of the frequency, so that it is impossible to use the antenna in certain frequency ranges.

Thus, in order to solve this problem, antenna systems have been used until now which include a number of antennas, each of which covers a specific frequency range.

Antenna systems such as these have the disadvantages of the increased space requirement and of suboptimum matching of the antennas to the individual frequencies from the respective frequency band.

DE 19943118 and DE 19919107 each disclose tunable antennas in which the antenna is tuned by adjustment as a function of at least one variable which represents a function of the transmission/reception quality of the radio transmitter/radio receiver (SE).

Systems such as these have the disadvantage that they use mechanically loaded moving elements (adjustment devices) which results in an increased probability of failure.

DE 40 35 766 A1 discloses an electronic controllable antenna with a thin-film structure, in which an insulating material which insulates, for example, a liquid crystal dielectric, which is mounted in a plastic, is enclosed between a base plate and a printed circuit board, in which the relative dielectric constant and/or permeability in the radio-frequency range can be varied corresponding to an electromagnetic field which is applied, and in which the dielectric constant and/or permeability are/is varied via a DC voltage or low-frequency electromagnetic waves, such that impedance matching and a resonant frequency of the antenna can be optimized.

An object to which the present invention is directed is to refine a radio transmitter and receiver such that a virtually constant stable antenna gain is ensured, while covering a wide frequency range.

SUMMARY OF THE INVENTION

The radio transmitter and receiver according to the present invention has a first electrically acting antenna body in whose near region a dielectric body is arranged, with the near region referring to the dielectric body being at a distance from the antenna body with respect to wavelengths from a wavelength range which may be used by the mobile radio transmitter and receiver such that the phase delay times which result from that distance do not produce any change to the transmission characteristics in comparison to the desired transmission characteristic. The dielectric body is designed such that its dielectric constant can be varied by at least one control signal, which is produced as an output signal from a closed-loop control device. The control signal is produced by the closed-loop control device until the configuration of this dielectric body results in the dielectric body having a dielectric constant which ensures an optimum value for at least one physical variable, which represents a function of the transmission/reception quality of the radio transmitter and receiver, is detected by a detector and is passed as an input signal to the closed-loop control device, with an optimum value being produced (which can be predetermined or limited, in particular, by the design of the electronic components of the radio transmitter and receiver) when the physical variable which represents a function of the transmission/reception quality of the radio transmitter and receiver allows the conclusion that the transmission/reception quality is a maximum; in particular, in the context of the capability provided by the design.

A major advantage of the mobile radio transmitter and receiver according to the present invention is that the antenna gain is largely stable over a wide frequency range, which is achieved by close-loop control at an optimum value of the variable or variables which represents or represent the reception quality, by varying the dielectric constant of the dielectric body in the near region, that is to say, in the immediate vicinity, of the antenna body, with their being no need to move either the antenna (the antenna body) or the dielectric body, thus reducing the space required and the production costs.

A major advantage of one embodiment is the low-cost implementation of the dielectric body with a variable dielectric constant, since the dielectric constant of ferromagnetic domains on the dielectric body which is coated with them is changed by an external DC voltage field, which can be produced only by application of a DC voltage, using the first layer as one electrical pole and the first electrical antenna body as the second electrical pole, so that only one control signal is required.

Another embodiment allows, firstly, the first layer to be protected against external influences, but it also can fix the first layer, especially if the first layer is an electrolyte. One major advantage of yet another embodiment is the high dielectric constant provided by ceramic, since the frequency range in which the antenna can be tuned and, thus, be used increases in proportion to the magnitude of the dielectric constant of the hollow body that is being used, and the procurement costs are low since ceramic bodies, in particular those provided with ferromagnetic domains, are produced in large quantities, for example as bodies for resonators and capacitors.

A major advantage of a further embodiment is that non-directional external influences are minimized, since these have a greater effect the greater the electrically effective antenna length of an antenna.

Another advantage of an embodiment is that any directional electrical influence on the antenna resulting from the user, in particular his/her head or his/her hands, on the radio transmitter and receiver is minimized, and vice versa.

A major advantage of yet another embodiment is the flexibility and capability to update the implementation of the closed-loop control system, made possible by the use of (closed-loop control) software, as well as the capability to use already existing processors for controlling the mobile radio transmitter and receiver according to the present invention by the use of additional software and/or the adaptation of existing software.

Major advantages of another embodiment are the simple and advantageous implementation of the control unit, and the capability to implement this switching mechanism as an integrated circuit in an upgrade module.

A further embodiment also very largely protects a transmitted or received signal against disturbance influences from the control signal $U_{ST}$.

An advantage of this embodiment is that this makes it possible to use the mobile radio transmitter and receiver in a frequency range in which the ratio of the highest frequency to the lowest frequency is at least 1.5 octaves.

The detection of the forward transmission power level and return transmission power level as a physical variable which represents a function of the transmission/reception quality of the radio transmitter and receiver allows simple implementation of the closed-loop control (matching) for the antenna, since parts which already exist in the radio transmitter and receiver can be used for this purpose.

Moreover, another embodiment of the present invention provides a filter, such as a helix filter, which allows an antenna to be tuned within a wide frequency range without needing to modify the construction of the antenna.

Additional features and advantages of the present invention are described in, and will be apparent from, the following Detailed Description of the Invention and the Figures.

DETAILED DESCRIPTION OF THE INVENTION

Figure 1:
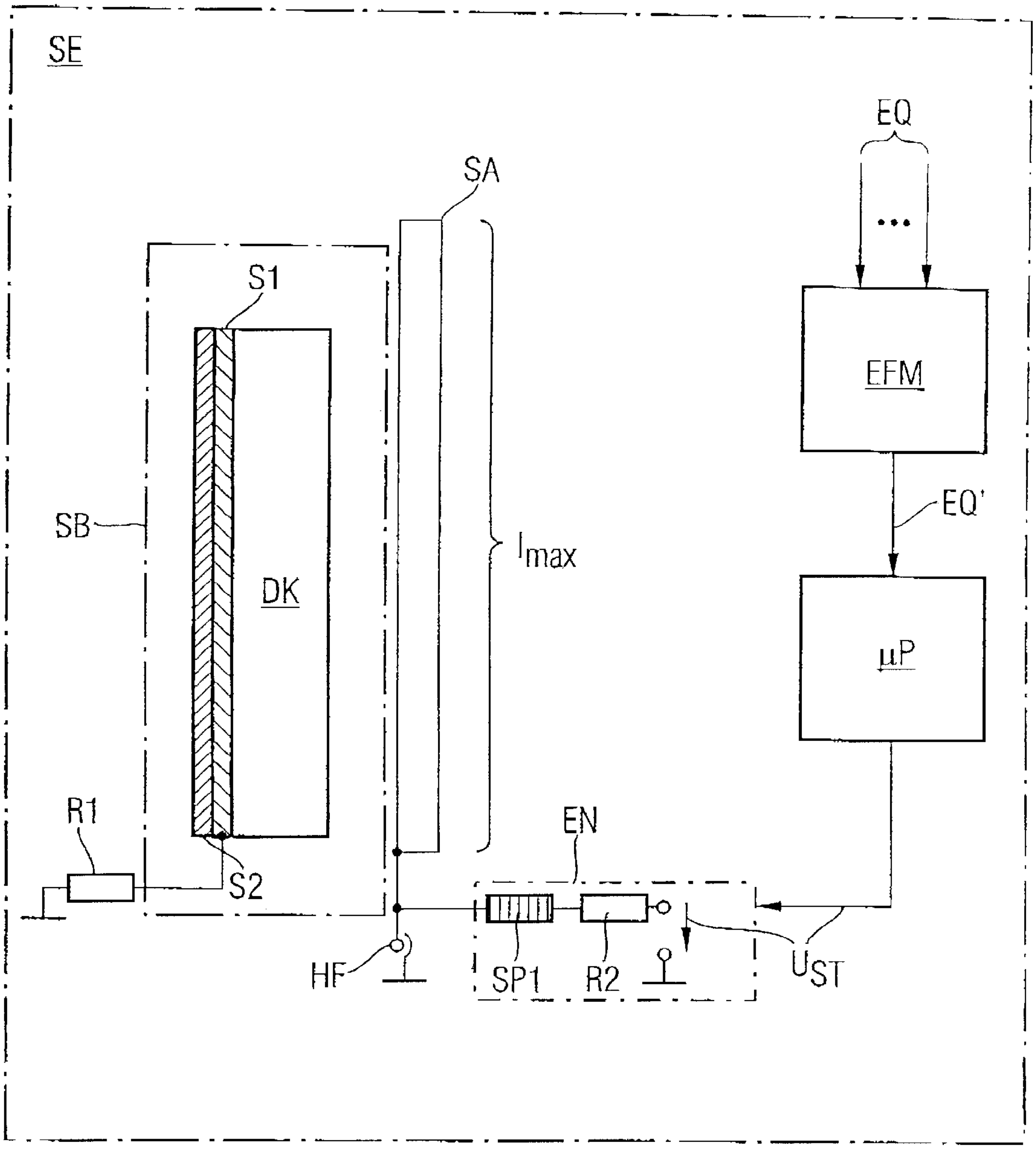
FIG. 1 shows a mobile radio transmitter and receiver with a rod antenna, in which a dielectric body which is in the form of a rod is arranged parallel to the antenna, and the dielectric constant of the dielectric body can be varied via a DC voltage which is supplied to the rod antenna via a circuit.

FIG. 1 shows a mobile radio transmitter and receiver SE with a transmitting/receiving antenna in the form of a rod antenna SA, in which the length of the rod antenna SA governs the maximum antenna length $l_{MAX}$ that is effective for radio purposes.

A dielectric body in the form of a rod SB is arranged parallel to the longitudinal axis of the rod antenna SA. The separation of the rod SB should not be an excessively great distance with respect to the wavelength, since the different phase delay times which otherwise occur result in a different transmission characteristic in comparison with the normal transmission characteristic for rod antennas (monopole antennas).

The wavelengths which may be used for the radio transmitter and receiver in this case depend (via the known frequency/wavelength/speed-of-light relationship) on the frequencies contained in the frequency range to be covered by the antenna SA.

Alternatively, the dielectric body SB may have any other desired geometric shape. The only essential feature is that the dielectric body SB is located in the near field of the antenna, with the antenna being tuned such that the dielectric constant of the dielectric body SB is varied, so that it is tuned to the current frequency.

The way in which the geometric shape can be chosen depends, in particular, on the antenna and its shape and can be determined, for example, by simulation or by trial constructions.

The frequency range covered becomes greater the greater the interval of the adjustable dielectric constant of the dielectric body SB, in which case the dielectric body SB must have a very high dielectric constant (preferably $\in_r$ approximately 200) in the quiescent state (that is to say, when no DC voltage field is applied) and this can be ensured, in particular, by using a dielectric body SB with a high dielectric constant and/or by enlarging the volume of the dielectric body SB to be used.

Thus, the dielectric body SB can be manufactured, for example, from ceramic, since ceramics, particularly those with ferrodynamic domains, can be produced with a required high dielectric constant of, for example, $\in_r$ of approximately 200.

The dielectric rod SB is manufactured from ceramic and has so-called ferromagnetic domains; that is to say, the ceramic is designed such that it has regions with atomic magnetic dipoles which can be aligned such that they are predominantly parallel, spontaneously or via an external electrical influence, so that magnetic domains are produced. Since ferromagnetic domains are sensitive to electrical influences, any DC voltage field which is applied has an influence on the dielectric constant of the dielectric rod SB. In order to make it possible to subject the dielectric rod SB with the ferromagnetic domains to a DC voltage field, the dielectric rod SB is covered with an electrically conductive first layer S1 which does not, however, influence any electrical alternating field; for example, transmission from the antenna. An electrolyte or the material graphite would be feasible, for example, for use as the material for the first layer S1.

The DC voltage field required to influence the dielectric constant is achieved by applying a DC voltage $U_{ST}$ to the rod antenna SA, such that the rod antenna SA forms one pole of the electrical DC voltage field and the first layer S1 forms the second pole (the opposing pole) of the electrical DC voltage field, with the first layer S1 being connected to an electrical zero potential (ground) via a high-value resistor R1, with a resistance of considerably more than 50Ω.

The high first resistance ensures that transmission/reception signals can be transmitted and received, respectively, without any impediment via the rod antenna SA despite the dielectric body, which is sheathed with a conductive material and is located in the near field of the rod antenna SA.

The voltage $U_{ST}$ may, for example, be applied jointly via an RF connection which is required for passing on an RF signal, with a circuit EN, such as a series circuit including a second resistor R2 and a first coil SP1, being provided for decoupling between the RF connection and a connection for the DC voltage $U_{ST}$.

A second layer S2 protects the first layer S1, particularly against external influences, but, particularly if the material of the first layer is an electrolyte, it is also an apparatus which prevents this material from penetrating the outside.

The second layer S2 should have a very low dielectric constant, with at least approximately neutral dielectric response.

The DC voltage $U_{ST}$ is a signal (control signal) which is produced at the output of a closed-loop control unit (microprocessor) $\mu$p and whose magnitude, mathematical sign and/or signal duration are/is dependent on an input variable EQ which is applied to the closed-loop control unit $\mu$P.

The closed-loop control unit $\mu$P controls and/or varies the dielectric constant via the DC voltage $U_{ST}$ until a physical input variable EQ which represents the reception quality of the radio transmitter/radio receiver SE has reached an ideal value (optimum).

For this purpose, the DC voltage $U_{ST}$ is passed to the rod antenna via parts for decoupling EN, so that an electrical charge is stored on the surface of the rod antenna and a DC voltage field is produced by the first layer, as the opposite pole, which is connected to the zero potential, varying the dielectric constant of the dielectric body.

Thus, the surface of the rod antenna SA also must be designed such that an electrical charge, which is required for production of the DC voltage field, can be stored. The dimensioning of the individual physical variables (dielectric constant in the quiescent state, surface of the antenna, etc.) for the circuit may be determined, for example, via circuit simulation and may be optimized based on the use of a prototype.

In this case, a DC voltage $U_{ST}$ is first of all produced, which produces a predetermined value of the dielectric constant to be set (a default value) and continuously increases this value so that the dielectric constant likewise changes continuously. If the evaluation process shows that the input variable EQ is not the ideal, the DC voltage value $U_{ST}$ is changed until the input variable EQ has reached the ideal value.

Alternatively, the closed-loop control process can be allowed to start from a defined start value of the DC voltage; for example, 0 volts.

The possibly preprocessed input variable EQ is passed to the closed-loop control unit $\mu$P via parts EFM for detection of physical input variable EQ which are dependent on the extent of overlap M, and are transformed, if necessary, to a form required for the closed-loop control unit $\mu$P.

Alternatively, the parts EFM also detect a number of physical input variables EQ and preprocess them, if necessary, before passing them to the closed-loop control unit $\mu$P, in which case the closed-loop control unit $\mu$P checks a number of input variables in an appropriate manner to determine whether they have reached an ideal value.

Figure 2:
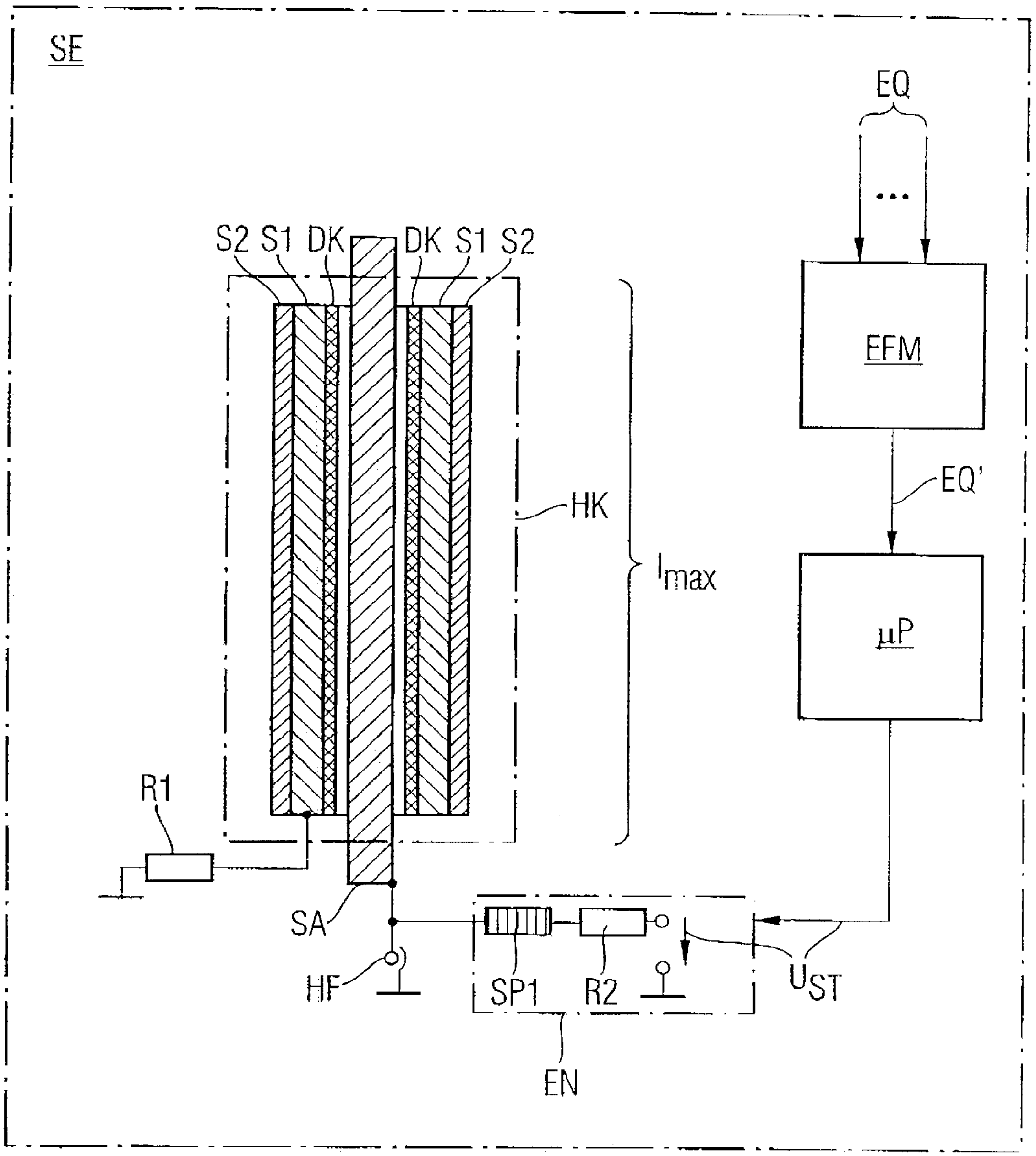
FIG. 2 shows a mobile radio transmitter and receiver with a rod antenna which is enclosed by a dielectric body that is in the form of a hollow cylinder (illustrated in the form of a section), in which case the dielectric constant of the dielectric body can be varied via a DC voltage which is supplied to the rod antenna via a circuit.

FIG. 2 shows a mobile radio transmitter and receiver SE with a transmitting/receiving antenna in the form of a rod antenna SA, in which the length of the rod antenna SA is used to determine the maximum antenna length $l_{max}$ which is effective for radio purposes.

A dielectric body HK in form of a hollow body is arranged symmetrically with respect to the longitudinal axis of the rod antenna SA, such that the longitudinal axis of the rod antenna SA coincides with the longitudinal axis of the dielectric hollow body HK. The diameter of the hollow body HK should be chosen such that the side walls of the hollow body are not at an excessive distance with respect to the wavelength, since the different phase delay times which otherwise occur result in a different transmission characteristic in comparison to the normal transmission characteristic for rod antennas (monopole antennas).

Like the exemplary embodiment described in FIG. 1, the hollow body has ferromagnetic domains, and is likewise covered with a first layer S1 and with a second layer S2.

The statements which have been made with respect to the dielectric body in FIG. 1 apply equally to the hollow body HK, with this also applying to the connections HF and the device for decoupling EN.

Only the closed-loop control system which leads to the change in the dielectric constant of the hollow body HK on the basis of a DC voltage $U_{ST}$ differs from that described in FIG. 1, and this will be discussed in more detail.

This voltage $U_{ST}$ is a signal (control signal) which is produced at the output of a closed-loop control unit (microprocessor) $\mu$P and whose magnitude, mathematical sign and/or signal duration are/is dependent on the input variable EQ which is applied to the closed-loop control unit $\mu$P.

The input variable EQ is determined by detection parts that are provided.

These detection parts EFM may be designed such that they have a directional coupler RK which decouples a forward transmission power level and a return transmission power level from a transmission signal (this refinement of the detection parts also can be found in the embodiment of the present invention described in FIG. 1).

The forward transmission power level is then, first of all, rectified by a first rectifier, and the rectified forward transmission power level is then converted by a first analog/digital converter to a first digital signal. The return transmission power level is rectified by a second rectifier, and the rectified return transmission power level is then converted by a second analog/digital converter to a second digital signal.

The digital signals are applied as an input signal to the closed-loop control unit $\mu$P, with the closed-loop control unit $\mu$P being, for example, in the form of a (micro)processor with associated software. The processor $\mu$P uses the applied digital signals to check whether the signals have each reached an ideal value; no return transmission power level or a minimum return transmission power level and a maximum forward transmission power level.

If this is the case, the present control signal $U_{ST}$ and the DC voltage field constant are maintained.

If this is not the case, the processor $\mu$P first of all, for example, continuously increases the value of the present DC voltage $U_{ST}$ such that the dielectric constant of the hollow body is changed; in particular, starting from the default value. The input signals (forward and return transmission power levels) which are varied by this process and are applied to the processor are checked by the processor to determine whether they are at the ideal values that are to be achieved. If the values of the signals (forward and return transmission power levels) have become worse with regard to reaching the ideal values, then, for example, the value of the DC voltage $U_{ST}$ is continuously reduced. This may even lead to the mathematical sign of the signal $U_{ST}$ being reversed.

Once the correct direction has been determined, the DC voltage $U_{ST}$ is produced until the dielectric constant, which is varied by the DC voltage field resulting from the DC voltage $U_{ST}$, ensures that the forward and return transmission power levels have reached their ideal values.

Alternatively, only one of the two variables (forward transmission power level or return transmission power level $P_R$) also may be used as the controlled variable for this control loop; that is to say, being detected by the parts EFM and being checked by the processor $\mu$P to determine whether it has reached the ideal values (minimum or no return transmission power level or maximum forward transmission power level).

As an alternative to the use of an additional processor $\mu$P, it would be feasible to upgrade already existing processors via suitable control software in order to allow this closed-loop control process to be carried out.

If an additional processor $\mu$P were used, it also would be feasible to integrate the parts EFM in the processor $\mu$P.

Mobile radio transmitters and receivers have been described above, in particular, because the present invention is used particularly advantageously in the case of mobile radio transmitters and receivers, primarily due to the weight reduction, space saving, etc. However, the present invention is advantageous not only in the case of mobile radio transmitters and receivers but also in the case of radio transmitters and receivers.

The exemplary embodiments discussed represent only some of the embodiments which are possible via the present invention. For example, a person skilled in the art will be able to create a large number of further embodiments via advantageous modifications without, in the process, changing the character (essence) of the present invention, the tuning of an antenna by moving a dielectric body in the near field of the antenna. These embodiments likewise should be covered by the present invention.

Indeed, although the present invention has been described with reference to specific embodiments, those of skill in the art will recognize that changes may be made thereto without departing from the spirit and scope of the present invention as set forth in the hereafter appended claims.

What is claimed is:

1. A radio transmitter and receiver, comprising:

an electrically acting antenna body;

a dielectric body arranged in a near field of the electrically acting antenna body, the dielectric body having ferromagnetic domains and being formed of ceramic, and being at least partially covered with a first layer such that a dielectric constant of the dielectric body is resistant to electrical alternating fields and can be influenced by electrical DC voltage fields, with the dielectric constant of the dielectric body being varied via at least one control signal;

detection parts for detecting at least one physical variable which represents a function of the transmission and reception quality of the radio transmitter and receiver; and a closed-loop control device connected to the detection parts, wherein the physical variable is supplied as an input variable to the closed-loop control device, and the closed-loop control device controls the dielectric constant as a function of the input variable via the control signal until an optimum value is ensured for the physical variable.

2. A radio transmitter and receiver as claimed in claim 1, wherein the dielectric body is covered with a second layer which at least one of protects the first layer against external mechanical influences and fixes the first layer.

3. A radio transmitter and receiver as claimed in claim 1, wherein the electrically acting antenna body is a rod antenna and the dielectric body is a hollow body which at least partially sheaths the rod antenna along a longitudinal axis of the rod antenna.

4. A radio transmitter and receiver as claimed in claim 1, wherein the electrically acting antenna body is a rod antenna and the dielectric body is a rod arranged parallel to the rod antenna on a longitudinal side of the rod antenna.

5. A radio transmitter and receiver as claimed in claim 1, wherein the closed-loop control device is a processor with software designed for production of the control signal.

6. A radio transmitter and receiver as claimed in claim 1, wherein the closed-loop control device is a switching mechanism.

7. A radio transmitter and receiver as claimed in claim 1, further comprising decoupling parts arranged between a connection for the control signal and the electrically acting antenna body, wherein a radio-frequency signal which is one of received and transmitted by the electrically acting antenna body is decoupled from the control signal via the decoupling parts.

8. A radio transmitter and receiver as claimed in claim 1, wherein the closed-loop control device always sets a fixed value for the dielectric constant of the dielectric body as an initial value at a start of an adjustment process.

9. A radio transmitter and receiver as claimed in claim 1, wherein the detection parts detect a transmission power level of a transmission signal.

10. A radio transmitter and receiver as claimed in claim 7, further comprising a further electrically acting antenna body arranged in the near field of the electrically acting antenna body, wherein the dielectric body is arranged in the near field of the electrically acting antenna body and in a near field of the further electrically acting antenna body, and wherein the closed-loop control device, the detection parts and the decoupling parts are designed such that the electrically acting antenna body, the further electrically acting antenna body and the dielectric body produce a tunable filter.

* * * * *